United States Patent [19]

Doss

[11] 3,821,166

[45] June 28, 1974

[54] POLYMERCAPTAN EPOXY RESIN HARDENER

[75] Inventor: Richard C. Doss, Bartlesville, Okla.

[73] Assignee: Phillips Petroleum Company, Bartlesville, Okla.

[22] Filed: Mar. 12, 1973

[21] Appl. No.: 340,356

Related U.S. Application Data

[62] Division of Ser. No. 68,770, Sept. 1, 1970, Pat. No. 3,742,006.

[52] U.S. Cl. .............. 260/47 EN, 260/2 N, 260/59, 260/77.5 AM, 260/79
[51] Int. Cl............................................. C08g 30/14
[58] Field of Search......... 260/47 EN, 77.5 AM, 79, 260/2 N, 2 EC, 47 EC, 609 R, 455 A

[56] References Cited

UNITED STATES PATENTS

| | | | |
|---|---|---|---|
| 2,284,637 | 6/1942 | Catlin ................................... | 260/79 |
| 3,448,112 | 6/1969 | De Acetis et al. ................. | 260/47 X |
| 3,472,913 | 10/1969 | Ephraim ........................... | 260/47 X |
| 3,553,283 | 1/1971 | Doss ................................ | 260/47 X |

*Primary Examiner*—William H. Short
*Assistant Examiner*—T. Pertilla

[57] ABSTRACT

A polymercaptan epoxy resin hardener composition and a process for curing epoxy resins through the use of said composition wherein the curing process yields an epoxy adhesive possessing excellent high temperature stability.

4 Claims, No Drawings

POLYMERCAPTAN EPOXY RESIN HARDENER

This is a division of my copending application Ser. No. 68,770 filed Sept. 1, 1970 now U.S. Pat. No. 3,742,006.

This invention relates to novel polymercaptan compounds, their method of preparation, and to the use thereof in curing epoxy resins. In another aspect, this invention relates to a process for curing epoxy resins to impart exceptional high temperature utility through the application of the novel polymercaptan epoxy resin hardener herein disclosed.

Epoxy adhesives are basically thermosetting materials made by reacting epoxy resins with curing or hardening agents. The epoxy group of a 1,2-epoxy resin is a 3-membered ring,

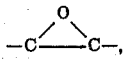

which is under great strain and will open easily through chemical means. A variety of compounds possessing active hydrogen atoms, for example, amines, acids, phenols, alcohols and thiols, are capable of opening the ring and forming a large molecule which in turn reacts with another epoxide starting a repetitive process which lasts until a hard and fusable material forms. These compounds containing active hydrogen atoms are called curing or hardening agents. The hard and fusable materials are termed "cured" or "hardened." In general, these cured products are characterized by good mechanical and high temperature strength, good heat and chemical resistance, and by outstanding ability to adhere to a wide range of substrates. The term "epoxy resin" is here defined to mean the monomer or prepolymer bearing epoxide end groups, wherein said epoxide end groups are to be subsequently involved in reactions with the active hydrogenbearing curing agent. The term "epoxy adhesive" applies to the cured polymer. Many different types of epoxy resins are available and can be used in the practice of this invention. Three resin types which are commonly important are listed as follows:

a. Diglycidyl ether of bisphenol A resin (generally called bisphenol A-epichlorohydrin resins, which are the most widely used epoxies).
b. Epoxy-novolacs (more accurately, glycidylated novolac resins).
c. Cycloaliphatic epoxies.

The polymercaptan epoxy hardener of this disclosure is applicable to the various types of epoxy resins and particularly to the three aforementioned classes of epoxies. Epoxy adhesives are well known for the wide range of substrates to which they are applicable. Metals, wood, concrete, polyolefins and essentially any solid substrate are included. The identity of the curing agent strongly influences both the conditions requisite for curing and also the properties of the resulting epoxy adhesive. Mercaptan or thiol curing agents possess an important advantage in their wide range of acceptable curing temperatures, for example, from below room temperature to the customarily required elevated temperatures. Their reactivity at room temperature permits utilization with unusually low-temperature sensitive substrates. Additionally, mercaptan or thiol curing agents are conveniently fast acting. Moreover, the mercaptan-cured epoxy adhesives possess superior bonding strength around room temperature and below. At elevated temperature, however, the mercaptan-cured epoxy adhesives are usually inferior in strength, for example, to amine-cured epoxy adhesives.

It is therefore an object of this invention to provide a polymercaptan curing agent for epoxy resins and a method for preparing same. It is a further object of this invention to provide a process for curing epoxy resins with said polymercaptan compounds wherein the resulting epoxy adhesives will retain their bonding properties at high temperatures.

The substance of my invention involves the preparation of a polymercaptan curing agent through the reaction of certain other polymercaptan compounds with selected diisocyanates. These resulting polymercaptan curing agents can be utilized for the hardening of epoxy resins whereby the epoxy resins are cured or hardened to an infusable and insoluble product possessing high temperature adhesive strength and performance.

The novel epoxy hardener of my invention can be synthesized from the reaction of 2,4-tolylene diisocyanate with 1,2,3-propanetrithiol according to the following equation:

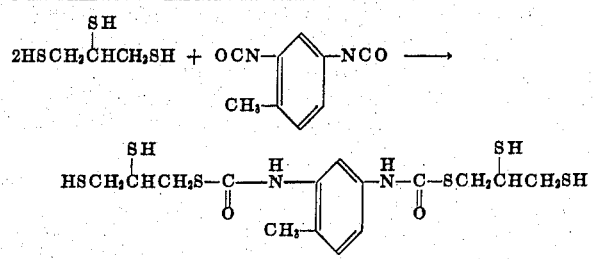

This reaction can also be utilized in preparing the other polymercaptan epoxy curing compounds of my invention.

In synthesizing the polymercaptan epoxy curing compounds of the instant invention, the mole ratio of trithiol to diisocyanate should be 2:1 or greater. Suitable polymercaptan reagents for the preparation of the epoxy hardening polymercaptan of my invention, are as follows: 1,2,3-propanetrithiol, 1,2,6-hexanetrithiol, 1,2,4-butanetrithiol, 1,3,5-cyclohexanetrithiol, tolylene-2,5-dithiol, and the like. Suitable diisocyanates which can be reacted to produce the curing agent of my invention are as follows: 2,4-tolylene diisocyanate, 2,6-tolylene diisocyanate, 1,5-naphthalene diisocyanate, p-phenylene diisocyanate, 4,4'-diphenylmethane diisocyanate, durene diisocyanate, and the like.

Epoxy resins having high temperature stability can be cured by the process of my invention through the use of the above curing agent. The process for curing epoxy resins according to my invention provides a polymercaptan hardener to epoxy resin ratio by equivalent weight of from about 1:075 to 1:1.25.

The epoxy resin curing agent of my invention is synthesized at atmospheric pressure in a three-stage process. In the first stage, 2,4-tolylene diisocyanate is added to 1,2,3-propanetrithiol at 0°–40°C (preferably 25°C) over a 0.75–1.5 hour period (preferably 0.75 hour). The reaction is completed by continued stirring at 0°–40°C (preferably 25°C) for 0.5–24 hours (preferably 1.0 hour) followed by further continued stirring at 25°–100°C (preferably 45°C) for 0.5–2 hours (preferably 1.0 hour).

In synthesizing the novel epoxy hardener of the instant invention, for example, 2,4-tolylene di(2,3-dimercaptopropylthiolocarbamate), the mole ratio of trithiol to tolylene diisocyanate should be at least 2:1 or greater, but no advantage is gained in employing excess trithiol beyond that necessary to insure complete utilization of the diisocyanate. While a trithiol to diisocyanate ratio of 2.0 is stoichiometric, a ratio as high as 3.0 may be used, with a ratio in the range of 2.0–2.5 being preferred. The trithioldiisocyanate reaction can occur conveniently in any non-reactive, polar solvent which can be subsequently readily excluded from the product upon completion of the reaction, for example, acetone, methyl ethyl ketone, methyl isobutyl ketone, ether, dioxane, tetrahydrofuran and the like. The concentration of this trithiol-diisocyanate reaction mixture must be sufficiently dilute to permit ample opportunity for complete utilization of all isocyanate groups, thus preventing significant polymer formation. Broadly, a concentration range comprising 10–50 per cent reactants can be used, with a range of 25–35 percent being preferred.

The process for synthesizing the polymercaptan epoxy resin hardening agent of my invention can be best illustrated by means of the following example.

EXAMPLE I

Synthesis of 2,4-Tolylene Di(2,3-dimercaptopropylthiolocarbamate)

2,4-Tolylene diisocyanate (35 g., 0.2 mol) in anhydrous methyl ethyl ketone (100 ml.) was added dropwise over a 45-minute period, under a nitrogen atmosphere at 25°C to 1,2,3-propanetrithiol (56.1 g., 0.4 mol) in anhydrous methyl ethyl ketone (150 ml.). The mixture was stirred for an additional hour at 25°C, followed by 1 hour at 45°C. After cooling, the volatiles were removed at reduced pressure to afford a 91 g. yield of 2,4-tolylene di(2,3-dimercaptopropylthiolocarbamate). Analysis: Calculated for $C_{15}H_{22}N_2O_2S_6$: SH, 29.1; Found: 30.4.

As indicated hereinabove, the polymercaptan of my invention is useful in the curing of epoxy resins. The epoxy adhesives cured by the use of the epoxy hardener of the instant invention possess remarkably high temperature utility. The epoxy adhesive derives from, for example, Epon 828 (diglycidyl ether of p,p'isopropylidene diphenol with epichlorohydrin); epoxy equivalent weight, 185–192) hardened by the polymercaptan of the instant invention possesses a demonstrated utility useful over the range −18°C to 125°C. The upper useful temperature range for these polymercaptan hardened epoxy adhesives will be 150°C or higher. The polymercaptan hardened epoxy resins of my invention possess high temperature utility while also possessing low temperature adhering properties. Even though the upper temperatures as demonstrated by my invention can be found in the art, for example, amine hardened resins, such resins require high temperature curing. The polymercaptan hardeners of my invention produce resins which can be cured at room temperature or below, and yet possess a useful temperature range of up to 150°C or higher. Clearly, an epoxy adhesive stable at these upper temperature ranges which can be cured at room temperatures or below, fulfills a need found in the art.

The process of curing epoxy resins with the polymercaptan hardener hereinabove disclosed can be best illustrated by means of the following Example II. Example II demonstrates the ability of the epoxy hardener of the instant invention, 2,4-tolylene di(2,3-dimercaptopropylthiolocarbamate), to generate epoxy adhesives of superior high temperature performance.

EXAMPLE II 2,4-Tolylene Di(2,3-dimercaptopropylthiolocarbamate) as an Epoxy Hardener Epon 828 (19.0 g.) and 2,4-tolylene di(2,3-dimercaptopropylthiolocarbamate) (10.5 g.) were combined and applied to aluminum strips for lap shear strength testing. The polymer system was hardened at 25°C/24 hours followed by final hardening at 100°C/24 hours. The lap shear strength test was made in accordance with the standard test procedure ASTM designation: D 1002/53T. Lap shear test data thus obtained appear as the first line in Table I.

Tabulated below in Table I are comparative data showing the superior high temperature performance of the tetramercaptan hardener of the instant invention employing Epon 828 as the epoxy compound.

TABLE I

| Hardener | Adhesive Lap Shear Strength, psi (aluminum-aluminum) | | | | |
|---|---|---|---|---|---|
| | 25°C | 50°C | 75°C | 100°C | 125°C |
| Invention | 2626 | 3020 | 3590 | 2740 | 993 |
| Propanetrithiol | 2956 | 2927 | — | 1307 | 267 |

What I claim is:

1. A process for curing an epoxy resin having more than one 1,2-epoxy groups, having high temperature stability comprising: contacting said epoxy resin with a polymercaptan synthesized through the addition of a trithiol selected from the group consisting of 1,2,3-propanetrithiol, 1,2,6-hexanetrithiol, and 1,2,4-butanetrithiol, and 1,3,5-cyclohexanetrithiol, to a diisocyanate selected from the group consisting of 2,4-tolylene diisocyanate, 2,6-tolylene diisocyanate, 1,5-naphthalene diisocyanate, p-phenylene diisocyanate, 4,4'-diphenylmethane diisocyanate, and durene diisocyanate, in which the mole ratio of trithiol to diisocyanate is at least 2:1.

2. A process according to claim 1 wherein the polymercaptan hardener to epoxy resin ratio by equivalent weight is from about 1:0.75 to 1:1.25.

3. A process according to claim 1 wherein said polymercaptan has the formula:

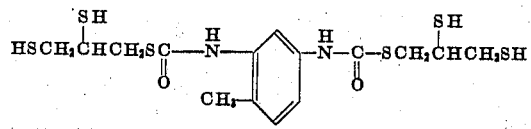

4. A process according to claim 1 wherein the mole ratio of trithiol to diisocyanate is within the range of 2:1 to 3:1.